(12) United States Patent
Towner et al.

(10) Patent No.: US 8,928,720 B2
(45) Date of Patent: Jan. 6, 2015

(54) APPARATUS AND METHOD OF SCANNING LIGHT USING AN ARRAY OF LIGHT SOURCES

(75) Inventors: David K. Towner, Boise, ID (US); Michael Plotkin, Rehovot (IL); Dror Kella, Nes-Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1123 days.

(21) Appl. No.: 12/090,322

(22) PCT Filed: Oct. 27, 2005

(86) PCT No.: PCT/US2005/039201
§ 371 (c)(1),
(2), (4) Date: Jun. 30, 2009

(87) PCT Pub. No.: WO2007/050086
PCT Pub. Date: May 3, 2007

(65) Prior Publication Data
US 2008/0278566 A1    Nov. 13, 2008

(51) Int. Cl.
| | |
|---|---|
| *B41J 2/47* | (2006.01) |
| *G02B 26/12* | (2006.01) |
| *H04N 1/191* | (2006.01) |
| *H04N 1/40* | (2006.01) |
| *H04N 1/113* | (2006.01) |
| *H04N 1/12* | (2006.01) |

(52) U.S. Cl.
CPC .............. *G02B 26/123* (2013.01); *B41J 2/473* (2013.01); *H04N 1/1911* (2013.01); *H04N 1/1918* (2013.01); *H04N 1/40025* (2013.01); *H04N 1/1135* (2013.01); *H04N 1/12* (2013.01); *H04N 2201/0082* (2013.01)
USPC .......................................................... 347/253

(58) Field of Classification Search
USPC ................. 347/229, 233, 234, 237–240, 248, 347/251–255; 359/206.1
See application file for complete search history.

(56) References Cited

U.S. PATENT DOCUMENTS

| | | | |
|---|---|---|---|
| 4,445,125 A | * | 4/1984 | Scifres et al. ................. 347/237 |
| 4,476,474 A | | 10/1984 | Kitamura |

(Continued)

FOREIGN PATENT DOCUMENTS

| | | |
|---|---|---|
| EP | 0357175 A | 3/1990 |
| EP | 0871322 A | 10/1998 |

(Continued)

OTHER PUBLICATIONS

Thornton, Robert L.: "Vertical Cavity Lasers and their Application to Laser Printing"; Proceedings of the SPIE: Vertical-Cavity Surface-Emitting Lasers, vol. 3003, Apr. 1997, pp. 112-119.

(Continued)

*Primary Examiner* — Hai C Pham

(57) ABSTRACT

Apparatus comprising a two-dimensional array of light sources (40) and a scanning device (26) arranged to scan light (14) emitted from the light sources (40) onto a medium (10) to generate a plurality of scan lines (52) on the medium (10), the light sources (24 and scanning device (26) being arranged such that a plurality of light sources (24) can be used to generate each scan line (52) of the plurality of scan lines (52).

10 Claims, 9 Drawing Sheets

(56) References Cited

U.S. PATENT DOCUMENTS

| | | |
|---|---|---|
| 4,775,896 A | 10/1988 | Umeda |
| 5,357,106 A | 10/1994 | Wilson |
| 5,473,358 A * | 12/1995 | Guerin .......................... 347/240 |
| 5,640,190 A * | 6/1997 | Bollansee et al. ............ 347/240 |
| 5,808,656 A | 9/1998 | Goldmann |
| 5,905,851 A * | 5/1999 | Morimoto et al. ............. 358/1.4 |
| 6,121,983 A | 9/2000 | Fork |
| 6,144,685 A | 11/2000 | Iwasa |
| 6,184,971 B1 * | 2/2001 | Narita et al. .................... 355/67 |
| 7,443,559 B2 * | 10/2008 | Kim et al. .................. 359/206.1 |
| 2005/0157160 A1 * | 7/2005 | Vazan .......................... 347/238 |

FOREIGN PATENT DOCUMENTS

| | | | |
|---|---|---|---|
| JP | 09083720 | 3/1997 | |
| JP | 11295285 | 10/1999 | |
| WO | WO 2004/110052 A1 * | 12/2004 | ............... H04N 1/04 |

OTHER PUBLICATIONS

International Search Report for PCT Patent Application No. PCT/US2005/039201.

* cited by examiner

APPARATUS AND METHOD OF SCANNING LIGHT USING AN ARRAY OF LIGHT SOURCES

BACKGROUND OF THE INVENTION

Laser printers, digital printing presses, copiers, fax machines, plate setters, direct-to-film laser printers, scanned laser displays, other printing and display devices and some systems used for the fabrication of electrical circuits, use a plurality of light sources to emit light that is scanned across a medium. The light produces a number of exposed scan lines on the medium where the medium has been altered by the light to form a latent image. The scan lines can suffer from a number of errors which may be caused by the optical system used to produce the scan lines on the photosensitive medium, for example due to an aberration such as distortion in the optical system.

Dry toner laser printers, liquid electrophotographic (LEP) laser printers and LED printers (to name only some printers) generally use a discharge area development (DAD) electrophotographic process in which light is used to selectively discharge electrical charge on a photoconductor to form a latent electrostatic image. Electrically charged toner or ink is then applied to the photoconductor and adheres to the photoconductor in exposed regions in which the electrical charge has been discharged but does not adhere in unexposed image regions which have not been discharged. The adhered toner or ink is then transferred to a print medium such as paper and fused onto the print medium. Errors in the scan lines produced on the photoconductor can produce visible artifacts in the printed image on the print medium, which are undesirable. Some electrophotographic devices use charge area development (CAD), for example, many photocopiers use CAD.

For electrophotographic printers, a certain exposure energy density, for example measured in $\mu J/cm^2$, is necessary to adequately discharge the electrical charge on the photoconductor. The exposure energy density for a particular region of photoconductor can be regarded as the product of the power density (normally measured in $mW/cm^2$) of the light incident on the photoconductor and the exposure time of the photoconductor by the light for that region of the photoconductor. The process speed of the printers is, at least in part, limited by the exposure time that is necessary to adequately discharge the electrical charge on the photoconductor.

Some systems used for the fabrication of electrical circuits scan light onto a substrate to produce a scan line on the substrate by means of a photochemical reaction. A minimum exposure energy density may be required for the light incident on the substrate in order that a circuit can be properly manufactured. Artifacts resulting from scan line errors may be detrimental to the performance of the electrical circuit that is produced.

SUMMARY OF INVENTION

Aspects and embodiments of the invention are set out in the appended claims.

It will be appreciated that various features of some embodiments and aspects of the invention can be combined with other features of other embodiments and aspects of the invention. Similarly, embodiments and aspects of the invention that are expressed in terms of apparatus features can also be expressed in terms of method features and vice versa. All combinations, in any number, of features are envisaged and disclosed. Similarly, embodiments and aspects of the invention that are expressed as method steps can also be expressed as software, which when operated on a processor, are configured to perform those method steps.

An embodiment of the invention provides a printer comprising a two-dimensional (2D) array of light sources and a scanning device arranged to scan light emitted from the light sources onto a photosensitive surface to generate a plurality of scan lines on the photosensitive surface, the light sources and scanning device being arranged such that a plurality of light sources can be used to generate each scan line of the plurality of scan lines.

The photosensitive surface may comprise a photoconductor.

An embodiment of the invention provides apparatus comprising light emitting means for emitting a 2D array of light beams and a scanning means for scanning light emitted from the light emitting means onto a medium to generate a plurality of scan lines on the medium, the light emitting means and scanning means being arranged such that a plurality of light beams can be used to generate each scan line of the plurality of scan lines.

An embodiment of the invention provides a printer comprising:
- a 2D array of vertical cavity surface emitting lasers;
- an optical means to receive light from the vertical cavity surface emitting lasers and form an array of light spots on a photosensitive surface;
- a polygon mirror arranged to scan the array of light spots onto the photosensitive surface to generate a plurality of scan lines on the photosensitive surface; and
- a controller to control the optical power of light produced by the vertical cavity surface emitting lasers;

wherein the vertical cavity surface emitting lasers and the polygon mirror are arranged such that a plurality of vertical cavity surface emitting lasers can be used to generate each scan line of the plurality of scan lines and the controller is arranged to supply control signals to each of at least two of said plurality of vertical cavity surface emitting lasers, the control signals being time-shifted equivalents of each other so that the scan line is produced by illuminating the same areas of the medium with the at least two of the plurality of vertical cavity surface emitting lasers.

An embodiment of the invention provides a printer comprising:
- a 2D array of vertical cavity surface emitting lasers;
- an optical means to receive light from the vertical cavity surface emitting lasers and form an array of light spots on a photosensitive surface;
- a polygon mirror arranged to scan the array of light spots across the photosensitive surface to generate a plurality of scan lines on the photosensitive surface; and
- a controller to control the optical power of light produced by the vertical cavity surface emitting lasers;
- wherein the 2D array of vertical cavity surface emitting lasers and the polygon mirror are arranged such that a plurality of vertical cavity surface emitting lasers can be used to generate each scan line of the plurality of scan lines, a scan line being a generally linear exposed area aligned in the direction of scanning where one or more light spots have exposed the photosensitive surface to form a row of pixels in a latent image; and the 2D array of vertical cavity surface emitting lasers is arranged such that each of the plurality of vertical cavity surface emitting lasers that can be used to generate a scan line on the medium is used to produce a light spot on the photosensitive surface such that the light spots have different positions relative to each other in a direction transverse to the direction of the scan lines (also called the process direction or cross-scan direction); and the controller is arranged to control the amount of light from each of the plurality of light sources used to generate the scan line that is incident on the medium to control the position of a scan line in the process direction.

In an embodiment of the invention, the controller is arranged to vary the optical power of the light emitted from each of the plurality of light sources according to the position on the photosensitive surface of the respective light spot of said each light source in the scan direction. In this way the controller may be arranged to control the position of the scan line in the process direction as a function of its position in the scan direction and thereby control the curvature of the scan line.

The controller may be arranged to control the plurality of light sources used to generate the scan line such that only one of the plurality of light sources is emitting light at any one time.

An embodiment of the invention provides a printer comprising:
an array of light sources;
an optical means arranged to receive light from an array of light sources and form an array of light spots on a photosensitive medium;
a scanning device arranged to scan the array of light spots across the photosensitive medium to generate a plurality of scan lines on the photosensitive medium,
the light source array comprising a plurality of rows, each row containing one or more of the light sources, the array being arranged so that light from each of the rows can be used to produce a respective one of the plurality of scan lines; and a controller to generate a plurality of data signals to control the light output from the plurality of rows of light sources, each of the plurality of data signals capable of having a different data content, the controller being arranged to control the number of data signals that have different data content to be one of a (i) number equal to the number of rows and (ii) a number less than the number of rows.

An embodiment of the invention provides a method comprising scanning light from a 2D array of light sources across a medium to generate a plurality of scan lines on the medium, the 2D array being arranged such that light from two or more of the light sources in the 2D array is used to generate each of the plurality of scan lines.

An embodiment of the invention provides a method of correcting scan bow in a printer, the printer comprising a 2D array of light sources and a scanning device arranged to scan light emitted from the light sources onto a photosensitive surface to generate a plurality of scan lines on the photosensitive surface, the light sources and scanning device being arranged such that a plurality of light sources can be used to generate each scan line of the plurality of scan lines and the plurality of light sources produce light spots that are offset in the process direction, the method comprising controlling the cross-scan position of at least one of the plurality of scan lines dynamically during scanning by adjusting the cross-scan distribution of light exposure applied to the photosensitive surface as a function of position in the scan direction, also referred to as format position. The adjustment to the distribution of light exposure may be achieved by controlling the optical power produced by each of the plurality of light sources.

An embodiment of the invention provides a method of reducing printing artifacts caused by scan line spacing errors between swaths of scan lines produced by a printer, the printer comprising a 2D array of light sources and a scanning device arranged to scan light emitted from the light sources onto a photosensitive surface to generate a plurality of scan lines on the photosensitive surface, the light sources and scanning device being arranged such that a plurality of light sources can be used to generate each scan line of the plurality of scan lines and the plurality of light sources produce light spots that are offset in the process direction, the method comprising controlling the cross-scan position of at least one of the plurality of scan lines during scanning by adjusting the cross-scan distribution of light exposure applied to the photosensitive surface. In this way a scan line can be shifted in the process direction.

An embodiment of the invention comprises software configured, when operating on a processor, to control light incident on a photosensitive surface in a printer, the printer comprising a 2D array of light sources and a scanning device arranged to scan light emitted from the light sources across the photosensitive surface, the software being configured, when operating on the processor, to control the light sources and scanning device such that light from a plurality of light sources is used to generate a scan line on the photosensitive surface.

An embodiment of the invention provides an array of light sources that produce an array of light spots arranged to produce a swath of scan lines, in use, in a scanning device; the array of light spots comprising a row of light spots spaced apart in the direction of the row by at least a first distance, and the row of light spots being at an angle inclined to the scan direction so as to produce a swath of scan lines with a spacing transverse to the scan direction that is smaller than the said first distance wherein the light source array has a plurality of light source rows inclined with respect to the scan direction, with light spots produced by light sources from at least a first and a second light source row lying on the same scan line, so that said same scan line is scanned, in use, by light from light sources from more than one light source row.

In an embodiment of the invention each scan line has the same predetermined number of light sources dedicated to it and the greatest dimension of the light source array is shorter than it would be if each row of light sources contained a light source for each scan line of the swath, the array having instead at least two shorter light source rows that have fewer light sources than there are scan lines in a swath and there being more light source rows than there are light sources per scan line.

In an embodiment of the invention the light source array has a peripheral envelope that is generally rectangular, and at least one long light source row which has one light source for each scan line in a swath, or substantially that number of light sources, and at least one shorter light source row having fewer light sources than the number of scan lines per swath and disposed in a corner region of said generally rectangular array.

In an embodiment of the invention said long light source row extends generally from one corner region of the rectangular envelope to the diagonally opposite corner region of the envelope, and wherein the shorter light source rows are disposed at the other two diagonally opposed corner regions of the envelope.

An aspect of the invention provides a scanning assembly comprising the light source array, an optical means for receiving light from the light source array and forming an array of light spots on a photosensitive surface and a scanning mirror adapted to reflect light from the light source array and to scan the array of light spots across a photosensitive substrate.

In an embodiment of the invention the array of light sources is arranged to generate a swath of scan lines, the array comprising a plurality of rows of light sources, each light source in a row being arranged to generate a different scan line in the swath of scan lines, wherein, the first row of the plurality of rows comprises light sources arranged to generate a first subset of the scan lines forming the swath and the last row in the plurality of rows comprises light sources arranged to generate a second subset of scan lines forming the swath that is mutually exclusive from the first subset.

In an embodiment of the invention the 2D array fits within a circumscribed rectangular array, the height of the rectangle being determined by the outermost light sources in the cross-scan direction and the width of the array being determined by the outermost light sources in the scan direction, the light sources being arranged to have a maximum spatial density for a specified spacing between light sources arranged to produce adjacent scan lines.

In an embodiment of the invention the light sources in the 2D array are arranged on a substrate having a desired shape, the light sources being arranged within that shape to have a maximum spatial density for a specified spacing between light sources (arranged to produce adjacent scan lines).

In an embodiment of the invention the 2D array of light sources is arranged to generate a swath of K scan lines, the array comprising a plurality of parallel rows of light sources, each light source in the row arranged to generate a different scan line in the swath of scan lines, wherein, the first row of the plurality of rows consists of Q light sources arranged to generate a first subset of Q scan lines of the swath and the last row in the plurality of rows consists of K-Q light sources arranged to generate a second subset of K-Q scan lines of the swath that is mutually exclusive from the first subset.

In an embodiment of the invention the light sources in the 2D array are arranged on a substrate having a desired shape so that the light sources have a maximum spatial density on the substrate for a set spacing between light sources, the light sources being arranged as a plurality of rows and a first row at one side of the substrate comprises light sources arranged to generate a first subset of scan lines of the plurality of scan lines and a second row at the other side of the substrate comprises light sources arranged to generate a second subset of scan lines of the plurality of scan lines.

BRIEF DESCRIPTION OF THE DRAWINGS

Embodiments of the invention will now be described, by way of example only, with reference to the accompanying drawings, of which.

DETAILED DESCRIPTION

Figure 1:
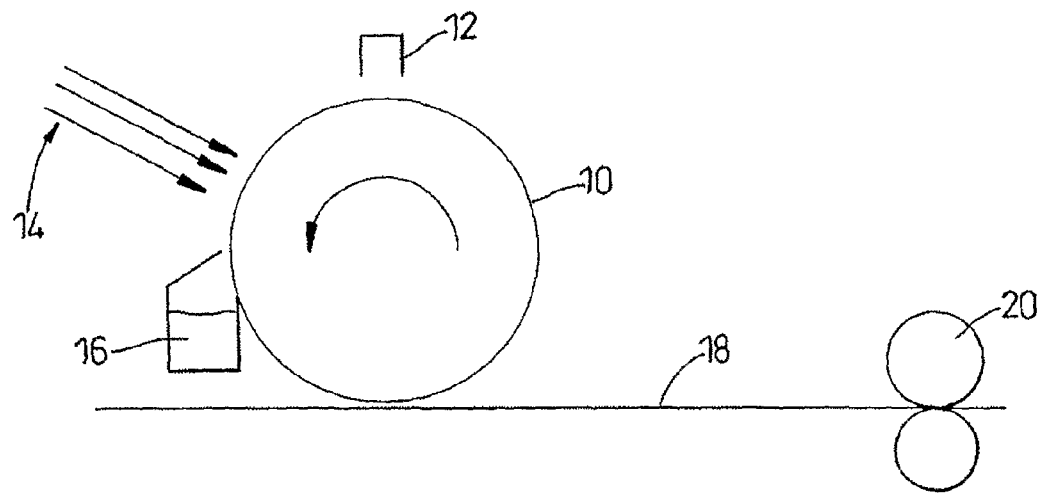
FIG. 1 schematically illustrates a printer according to an embodiment of the invention.

Referring to FIG. 1, a printer comprises a photoconductor 10 that generally forms the outer surface of a rotatable cylindrical drum. During the printing process the surface of the photoconductor 10 is uniformly charged with static electricity by, for example, a corona discharge 12. Portions of the photoconductor 10 are exposed with light 14 from an array of light sources 40 (illustrated in FIGS. 2 and 3). The drum is rotated so that the image to be printed is formed on the photoconductor 10. The light 14 discharges the charge on the drum in exposed areas and leaves a charged latent image. The latent image is then developed by applying a toner 16, such as a liquid ink toner (e.g. as in LEP printing) or a pigmented dry powder toner, over the surface of the photoconductor 10. The toner 16 adheres to the discharged areas of the photoconductor 10 so that the latent image becomes visible. The toner 16 is then transferred from the photoconductor 10 to a sheet of paper 18 or to some other medium which is to support the printed image. A fuser 20 may be used to fix the image to the paper 18 by applying heat and pressure, or pressure alone, to the toner 16 on the paper 18. The direct-to-paper transfer system shown in FIG. 1 represents only a subset of electrophotographic printers. Many electrophotographic printers use an intermediate transfer drum or belt to receive the toner image from the photoconductor and apply it to the print medium. Some printers have no separate fuser, and the fusing process occurs during the transfer from the intermediate transfer drum to the paper.

Figure 2:
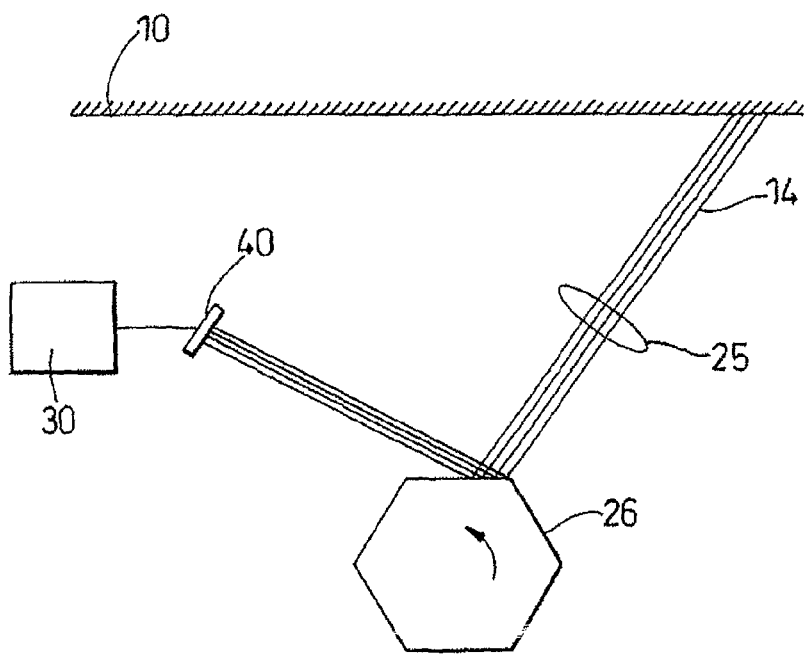
FIG. 2 schematically illustrates an optical system, according to an embodiment of the invention, for use with the printer of FIG. 1.
Figure 3:
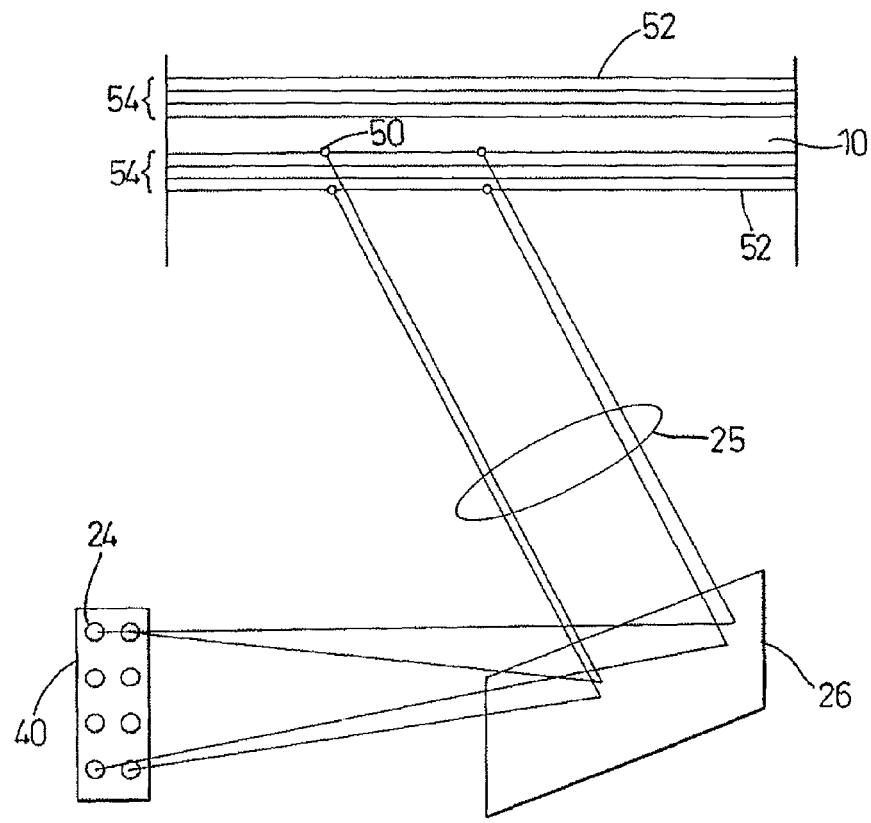
FIG. 3 is a schematic perspective view of the optical system of FIG. 2.

Referring to FIGS. 2 and 3, an optical system that can be used as part of the printer comprises an array of light sources 40, optical components 25 that receive light from the array of light sources and form an array of light spots 50 on a photosensitive surface 10, and a scanning device that deflects the array of light spots 50 across the photosensitive surface 10. FIG. 2 shows a plan view of the optical system whereas FIG. 3 shows a perspective view of the optical system. The scanning device may take the form of, for example, a polygon mirror 26. FIG. 2 illustrates the scanning device as a hexagonal mirror 26, although a mirror with more or less sides could be used or a refractive or diffractive optical element could be used. Rotation of the mirror 26 causes light from the array of light sources 40 to be deflected by one of the mirror's faces and thereby cause the array of light spots 50 to scan from one side of the photosensitive surface 10 to the other to produce a swath of scan lines 54. That is, for a cylindrical photosensitive surface, the light is scanned in a direction parallel to the longitudinal axis of the cylinder. As the mirror 26 is further rotated, the laser light will become incident on a different mirror facet and a new scan across the photosensitive surface 10 is started. In this way a latent image is built up on the photosensitive surface 10 as a series of swaths, each swath comprising one or more scan lines on the photosensitive surface 10.

In the example illustrated in FIG. 3, a swath of four scan lines 52 is produced by simultaneously scanning the light output from eight light sources 24 in the array of light sources 40. For clarity, rays of light are only illustrated for four of the eight light sources 24 and only the active face of the polygon mirror 26 is shown. It should be understood that FIG. 3 is purely schematic and the geometry of the light rays is not intended to be accurate. An image is produced on the photoconductor 10 as a series of swaths 54. A swath 54 comprises a group of scan lines 52 that is produced simultaneously when light from the array 40 is scanned across the photoconductor 10. In the optical system illustrated in FIGS. 2 and 3, the rotation of polygon mirror 26 causes each successive facet of the polygon to produce a successive swath 54. In the example illustrated a swath 54 comprises a group of four scan lines 52. Generally, the number of scan lines 52 in a swath 54 will be determined by the process speed and addressability of the printer, and may be more or less than four. The gap between adjacent swaths 54 has been exaggerated in FIG. 3 for illustrative purposes, however, in general, the gap between adjacent swaths 54 will be the same, or about the same, as the gap between adjacent scan lines 52 within a swath 54.

The optical system may comprise other optical components 25 such as, among others, a lens to collimate the light from the array of light sources 40, mirrors to direct the light so that it follows a desired route through the printer and a scan lens to focus light reflected from the polygon mirror 26 onto the photoconductor 10.

It should be noted that other arrangements could be used to scan light across the photoconductor 10. In some arrangements the light can be scanned across the photoconductor 10 by having the beams from the array of light sources 40 in a fixed position and moving the photoconductor 10 in order to produce the scan lines on the photoconductor 10. In other arrangements both the photoconductor 10 and the array of light sources 40 and/or other optical elements may be moved in order to create the scan lines on the photoconductor 10.

The beams of light 14 from the array of light sources 40 are modulated by a controller 30 so that the appropriate portions of the photoconductor 10 are illuminated in order to obtain the desired latent image on the photoconductor 10. The controller 30 may function by sending electrical signals to the array of light sources 40 to control the optical power produced by each of the light sources 24 in the array 40.

Figure 4:
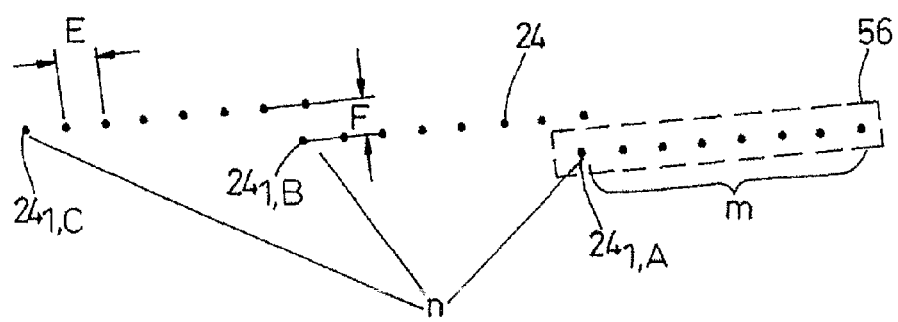
FIG. 4 schematically illustrates a two dimensional array of light sources according to an embodiment of the invention.

FIG. 4, is a schematic illustration of an example of an array of light sources 40. The array 40 is a two-dimensional (2D) array comprising n rows 56 of light sources 24 with each row 56 comprising m light sources. In the example illustrated in FIG. 4, the array 40 comprises twenty-four light sources 24 which are arranged as three rows 56 of eight light sources 24. In this case three light sources 24 can be used to generate each of eight scan lines 52. The light sources 24 need not be arranged in rows in this way and other geometries are possible. For example, the spacing between the emitters used for a scan line can be different for each scan line.

The light sources 24 may comprise lasers but other lights sources that can produce the required exposure energy density could also be used. In embodiments of the invention the light sources 24 comprise vertical cavity surface emitting lasers (VCSELs). An array of VCSELs can be manufactured on a single wafer with a small spacing between the lasers. For example, the spacing between the lasers may be of the order of 30 µm in both coordinate directions of the array. An array of VCSELs can be manufactured with an arbitrary spacing between the lasers above the minimum spacing that is practical. The minimum spacing is currently about 30 µm however this may become smaller as manufacturing techniques improve. An array of VCSELs can typically be produced for significantly less cost than an array of edge-emitting lasers.

Figure 5:
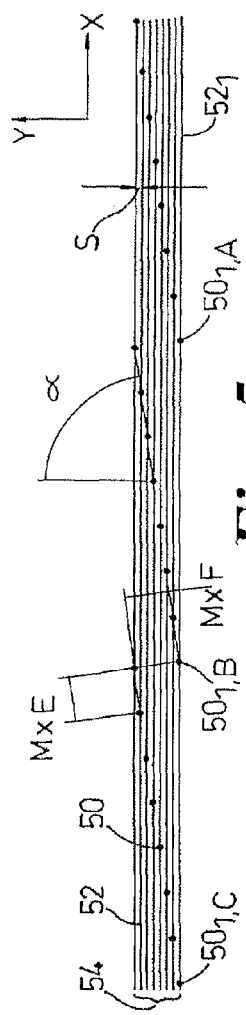
FIG. 5 schematically illustrates an array of twenty-four light spots in three rows for exposing eight scan lines according to an embodiment of the invention.

The 2D array of light sources 40 is capable of producing multiple beams of light 14 that form an array of light spots 50 that are scanned across the photoconductor 10. Referring to FIG. 5, the beams 14 form an array of light spots 50 on the photoconductor 10 which is an image of the array of light sources 40. The light spots 50 simultaneously expose multiple scan lines 52 on the photoconductor 10. FIG. 5 shows an arrangement of twenty-four focussed light spots 50 on a photoconductor 10 and a swath 54 of eight scan lines 52 produced by those spots 50. The array of light sources 40 may be larger or smaller so that there are more or less scan lines 52 per swath 54, for example, an array of light sources 40 may be used to generate twelve, eighteen or twenty-four scan lines 52 per swath 54. Each scan line 52 of a swath 54 is capable of being encoded with its own separate data content. The light spots 50 are illustrated as circular spots, however it may be preferable for the light spots 50 to be elliptical or otherwise non-circular to achieve the desired pixel shape in the exposed image. The shape of the focused spots can be controlled by the shape of an aperture stop in the optical system, the numerical apertures of the beams in the scan and cross-scan directions, and by other optical means well known in the art. The shape of light spots 50 is also affected by diffraction and aberrations produced by the optical system.

Two directions may be defined in relation to the array of light spots 50: one direction is the scan, or format, direction X which is the direction in which a spot 50 is scanned in order to produce a scan line 52; the other direction is the process direction Y (also referred to as the "cross-scan direction" or "transverse to the scan direction") which is substantially orthogonal to the format direction. The process direction is the direction in which the surface of the photoconductor 10 or other photosensitive medium is moved relative to the light spots 50 in order to generate an image from the scan lines 52. For the printer illustrated in FIG. 1, the process direction is defined by the direction of rotation of the photoconductor drum 10.

Generally, the beams of light 14 are focused with a scan lens to produce a magnified image of the array 40 on the photoconductor 10. If the spacing between the light sources 24 in a row 56 of light sources 22 is E and the spacing between the rows is F then the corresponding spacing of the light spots 50 on the photoconductor 10 will be, for example, M×E and M×F respectively, where M is the magnification of the optical system. More generally, the magnification M of the optical system will be different in the scan direction X and cross-scan direction Y and it will be necessary to use a scan direction magnification Mx and a cross-scan magnification My when determining spot separation distances on the photoconductor.

Figure 6:
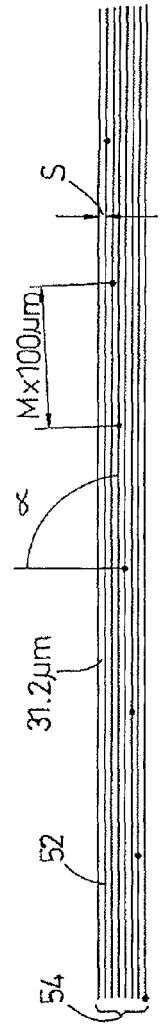
FIG. 6 schematically illustrates a prior art one-dimensional array of eight light spots for exposing eight scan lines.

To achieve a desired, sufficiently small, spacing S between the scan lines 52 at the photoconductor 10 it may be necessary to rotate the array of light spots 50 through a large angle α relative to the process direction Y. This rotation is necessary because the spacing of the light sources 24 within the array 40 is large compared to the scan-line spacing S and because the magnification M of the optical system further increases the separation of the focussed spots. Referring to FIG. 6, for sake of illustration a one dimensional array light spots can be considered in which the desired scan line spacing S is, say, 31.25 μm (for an 813 dots per inch (DPI) printer). If the spacing of lights sources is, say, 100 μm, which can typically be achieved with an array of edge emitting lasers, and the magnification of the optical system is, say, 6× and equal in the X and Y directions, then if the array was aligned with the process direction P then the resultant scan line spacing at the photoconductor 10 would be about 19.2 times too large. Using this example the array of light sources needs to be rotated through an angle of 87 degrees (arctan 19.2) to achieve the desired spacing S. For the swath of eight scan lines used in this example, a 100 μm separation between light sources and a 6× magnification, produces a light spot array having a scan-direction width of 4.19 mm and a scan line spacing sensitivity of 10.45 μm per degree of light source rotation.

For a two-dimensional array of light sources having two rows of emitters, as illustrated in FIG. 4, in which the light source spacing is for example 30 μm (as is achievable with a 2D array of VCSELs), the angle α between the long axis of the array and the process direction P can be reduced to 81.8 degrees and the scan direction width of the array can be reduced to 0.786 mm. The scan line spacing sensitivity for this array geometry is now 3.91 μm per degree of light source rotation.

The reduction in spacing of the light sources and the corresponding reduction in the sensitivity of scan line spacing to laser array rotation angle facilitates the alignment of laser arrays during the manufacture of the printer, reduces alignment errors that cause banding artifacts and minimizes the required dimensions.

As discussed, the array of light sources illustrated in FIG. 4 corresponds to the focused spot geometry of FIG. 5. For the purposes of illustration, the magnification of the optical system is the same in both the scan and cross-scan directions. However, the scan and cross-scan magnifications of the optical system may be different.

The controller 30 generates data signals to control the light emitted by the light sources 24. In one embodiment, all of the light sources 24 that expose a particular scan line are driven with a common data signal, except that the data signal applied to each light source 24 is time-shifted to compensate for the separation of the corresponding light spots along the scan line. Each of the control signals sent to each of the light sources 24 have substantially the same data content so that the same portions of the photoconductor 10 are exposed by each of the light sources 24. Thus, a common control signal is sent to the light sources labeled $24_{1,A}$, $24_{1,B}$, $24_{1,C}$, in FIG. 4 to generate the scan line labeled $52_1$ in FIG. 5 (and generally a common control signal is sent to the light sources $24_{m,A}$, $24_{m,B}$, $24_{m,C}$, to generate the scan line $52_m$). The time delay between the data signals for light sources 24 along a given scan line 52 is equal to the distance between successive light spots 50 divided by the spot velocity, where both quantities are measured in the scan direction X at the surface of the photoconductor 10. By time shifting the data signals in this manner, each exposed pixel receives the same nominal exposure from each of the multiple light sources 24 exposing a given scan line 52. Assume, for example, that three spots 50 are used to expose each scan line 52, that the velocity of the scanning spots 50 on the photoconductor is 2000 m/sec, and that the separation between adjacent light spots 50 along a scan line 52 is 180 μm. The required time shift between a first and second data signal would be 90 nanoseconds and the time shift between a first and third data signal would be 180 nanoseconds and the total exposure received by a pixel would be the sum of these individual exposures.

The time delay between the data signals sent to the light sources 24 can be achieved by a processor (signal generator) that generates and transmits the data signals so that there is the required time delay between the transmitted signals. In another arrangement the processor sends the data signals to a buffer and the buffer introduces time delays in the data signals before transmitting the data signals to the appropriate light sources 24. When a buffer is used the processor may produce all the data signals for a particular scan line 52 at substantially the same time and substantially all the required time delay is then produced by the buffer, or part of the required delay is produced by the processor and the remainder of the delay is produced by the buffer.

One implementation would be to store the scan line data in a memory location which is read into N separate buffers (in a system with N light spots per scan line) prior to the start of a scan. Each buffer outputs its data to a respective laser modulator in response to a clock pulse having a fixed time delay with respect to the optically generated start-of-scan signal. These fixed time delays are determined during press calibration and stored as an operating parameter of the press.

Extending the light source array 40 into two dimensions so as to provide multiple light spots 50 for each scan line 52 increases the effective light exposure in proportion to the number of light spots 50 used to produce each scan line 52. In a laser printer having no other impediments to increased speed, this increase in effective laser power can be used to achieve a proportionate increase in printing speed.

In another embodiment of the invention, the signals used to drive the multiple light sources 24 which expose a particular scan line 52 are no longer time-shifted copies of the same data signal. Instead, each signal is determined according to an algorithm that enables the number of exposure levels in the composite exposure applied to a given pixel to exceed the number of exposure levels produced by any one of the light sources 50. Suppose, for example, that for each of three light sources 50 eight exposure levels L=0, 1, 2 . . . 7 are available. Further suppose that each light source 24 is driven by a separate data signal and that the composite exposure level applied to a pixel is the sum of the three constituent exposure levels. The available composite exposure levels are now Lc=0, 1, 2, . . . 21. A composite exposure level of 1, for example, is achieved by activating a single light source at an exposure level of 1, while a composite exposure level of 21 is achieved by activating all three light sources 24 at an exposure level of 7. Intermediate levels are achieved in a similar manner. Thus, the number of available composite exposure levels per pixel is Lc=N(L−1)+1, where N is the number of light sources 24 per scan line 52 and L is the number of exposure levels per light source 24. Equivalently, letting I represent the exposure increment between successive exposure levels produced by a single light source 24, the overall exposure increment for a particular pixel after summing the contributions of each of the three light sources in the example is 3I when all light sources 24 are driven with the same signal, but is I when each light source 24 is driven with a separate signal as described above. Reducing the exposure increment from 3I to I nearly triples the number of exposure levels available to the printer system, enabling greater image bit depth without increasing the data rate of the signals supplied to the light sources 24.

In another embodiment of the invention, the signals used to drive the multiple light sources 24 which expose a particular scan line 52 are driven with complementary data signals. Complementary data signals are defined as any combination of data signals which result in the desired total exposure being delivered to a particular scan line.

Figure 7:
FIG. 7 schematically illustrates common mode scan bow which may be corrected according to an embodiment of the invention.
Figure 8:
FIG. 8 schematically illustrates differential scan bow due to positive distortion which may be corrected according to an embodiment of the invention.
Figure 9:
FIG. 9 schematically illustrates differential scan bow due to negative distortion which may be corrected according to an embodiment of the invention.
Figure 10:
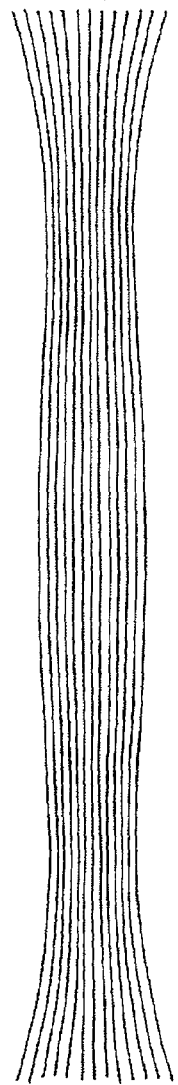
FIG. 10 schematically illustrates differential scan bow due to partially corrected distortion which may be corrected according to an embodiment of the invention.

Distortion or other optical non-idealities in the scanning system can cause curvature in the scan lines 52. The curvature is termed "scan bow" and may cause a visible artifact in the printed image. Scan bow takes various forms, for example, as illustrated in FIG. 7, the curvature may affect all scan lines 52 within a swath 54 substantially equally and is referred to as "common mode scan bow". In another form, the curvature varies within the print swath 54, as illustrated in FIGS. 8, 9 and 10, and is termed "differential scan bow". Embodiments of the invention correct differential scan bow by dynamically adjusting the cross-scan position Y of each scan line 52 as a function of format position X during scanning. Common mode bow may also be corrected by this method. This correction can remove scan line curvature and restore each scan line 52 to its desired cross-scan position at every location across the width of the format.

Scan bow correction may be implemented as follows. A two-dimensional light source array 40 is constructed and arranged as previously described, enabling each scan line 52 to be exposed by multiple light sources 24. The rotational position of the light source array 40 about the system axis is then set, or adjusted, by a small angular increment thereby introducing an incremental cross-scan separation of the trajectories of the multiple light spots 50 that produce each scan line 52. The light source rotational position may be set in the design, manufacture and alignment of the printer.

Figure 11:
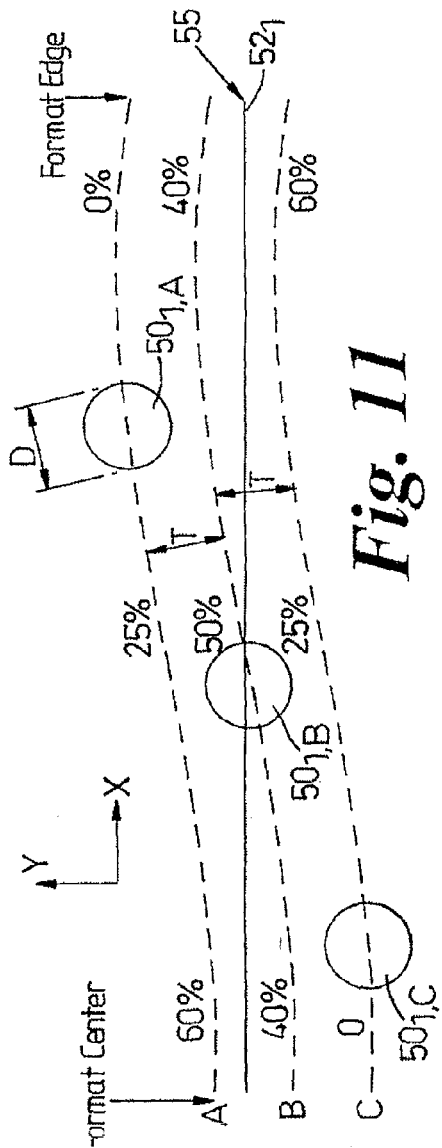
FIG. 11 schematically illustrates the trajectories of three light spots that may be used to correct scan bow according to an embodiment of the invention.

FIG. 11 illustrates a light spot geometry for an example system having three light sources 24 per scan line 52. For example the light sources labeled $24_{1,A}$, $24_{1,B}$, $24_{1,C}$, in FIG. 4 may respectively produce the light spots labeled $50_{1,A}$, $50_{1,B}$, $50_{1,C}$, in FIG. 11 if the axis of the light spot array is rotated about the system axis by a small angle $*$. For purposes of illustration, the angle $*$ has been shown greatly enlarged in FIG. 11. Each of the light spots $50_{1,A}$, $50_{1,B}$, $50_{1,C}$, that may be produced by the light sources $24_{1,A}$, $24_{1,B}$, $24_{1,C}$, has a different trajectory, A, B, C. Because the scan bow error to be corrected is small compared to the scan line spacing S, the separation between the multiple trajectories A, B, and C for a given scan line 52 is also chosen to be small compared to the nominal scan line separation. The separation T between the multiple trajectories is generally smaller than the light spot diameter D.

Scan bow errors are generally very small compared to the format width and the scale of FIG. 11 has been highly exaggerated in the process direction to better illustrate the correction method. As shown in FIG. 11, the focused light spots 50 on the photoconductor 10 follow curved trajectories in the scan direction (format direction) according to the scan bow present in the optical system. In the example illustrated, the rotational displacement, or alignment of the light source array 40 separates the three focused spot trajectories labeled A, B and C in the cross-scan direction Y.

The desired trajectory for the exposed scan line $52_1$ is shown by the straight line 55. The separation of trajectories A, B and C is determined by the geometry and alignment of the light source array 40, and the imaging properties of the optical system, and is chosen such that the desired scan line position 55 lies entirely between the outermost spot trajectories A and C. FIG. 11, shows the center of the format (scan) at the left side of the figure and the edge of the format (scan) is at the right side. At the center of the format, the desired scan line position 55 is between trajectory A and trajectory B, while at the edge of the format the desired scan line position 55 is between trajectory B and trajectory C. The position of the scan line is dynamically controlled during scanning by adjusting the distribution of exposure among the three scanning light spots as a function of format position, that is as a function of the position in the format direction X. Thus, the desired scan line position at the center of the format is achieved, for example, by providing 60% of the required exposure with light source A, 40% of the exposure with light source B and 0% of the exposure with light source C. At a format position between the center and the edge of the format light source A provides 25% of the required exposure, light source B provides 50% of the exposure and light source C provides 25% of the exposure. Continuing with the example, at the edge of the format light source A provides 0% of the required exposure, light source B provides 40% of the exposure and light source C provides 60% of the exposure. Thus, the distribution of exposure among the three light sources is continuously changed as a function of format position, thereby shifting the center of the exposed scan line in the process direction Y as needed to correct scan line curvature due to scan bow. When correcting common mode scan bow the distribution of exposure power among the multiple light sources 24 as a function of format position X may be similar for each scan line 52 within a swath 54. Correcting differential scan bow, however, generally requires the distribution of exposure among the multiple light sources as a function of format position X to be different for each scan line 52 within a swath 54.

The light sources 24 in the light source array can be arranged so that the regions of the photoconductor exposed by the resulting light spots 50 as the light spots travel along trajectories A, B, C overlap in the cross-scan direction Y. An exposed area of the photoconductor 10 discharges in response to the total light energy received by that area, whether the energy is received as a single exposure or as multiple exposures over a period of time. Therefore, an area of the photoconductor 10 will be discharged as a function of the sum of the exposure energy delivered to that area by the individual light spots, and the exposed area of the photoconductor 10 will effectively experience illumination by a spot that is a composite of the three individual light spots. The cross-scan position of the centroid of the light energy distribution forming the composite spot or, equivalently, the cross-scan position of the centroid of the composite exposure, can be moved by varying the distribution of light power among the three individual spots, thus the center of the exposed scan line can be moved to the desired location 55 at all points along the scan line.

Although three light sources 24 per scan line 52 were used for purposes of illustration in this example, a greater or lesser number of light sources 24 per scan line 54 can be used, with two light sources 24 per scan line 54 being the minimum number in some embodiments to enable correction of scan line position. In general, increasing the number of light sources 24 per scan line 54 increases the position accuracy and smoothness of the resulting position-corrected scan line 54.

In another embodiment, the light spot geometry is similar to that described above, except that the redistribution of light among the light spots 50 occurs discontinuously rather than continuously. In a limiting case, the entire exposure is provided by the light source 24 whose light spot 50 is closest to the desired scan line position 55. Scan line position errors due to scan bow are thus corrected in discreet steps rather than by a continuous redistribution of exposure among the light sources and a resulting exposed scan line may have multiple minute position offsets along its length.

The exposure delivered to a scan line 52 by a light source 24 can be controlled by varying the amount of optical power produced by the light source 24 in a power modulation system or by varying the time-width of pulses of light produced by the light source in a pulse-width-modulated exposure system, or by a combination of power modulation and pulse-width modulation, or in some other way. The control can be achieved by controlling the amount of light produced by a light emitter (such as a laser) or by controlling another optical element such as, for example an optical switch or light modulator, that may form part of the light source 24.

Differential scan bow can result from positive ("pincushion") distortion, as illustrated in FIG. 8, which causes the separation between scan lines 52 in a swath 54 to increase as a function of distance from the center of the format, or it can result from negative ("barrel") distortion, as shown in FIG. 9, which causes the separation between scan lines 52 to decrease as the distance from the center of the format increases. The vertical scale of both of these figures has been exaggerated to better show the nature of the error. More generally, differential scan bow can be the residual uncorrected error that results from partially correcting distortion in the design of the optical system. Third order distortion of one sign might, for example, be compensated by fifth order distortion of the other sign, resulting in differential scan bow with a more complex functional dependence on format position, an example of which is illustrated in FIG. 10.

Figure 12:
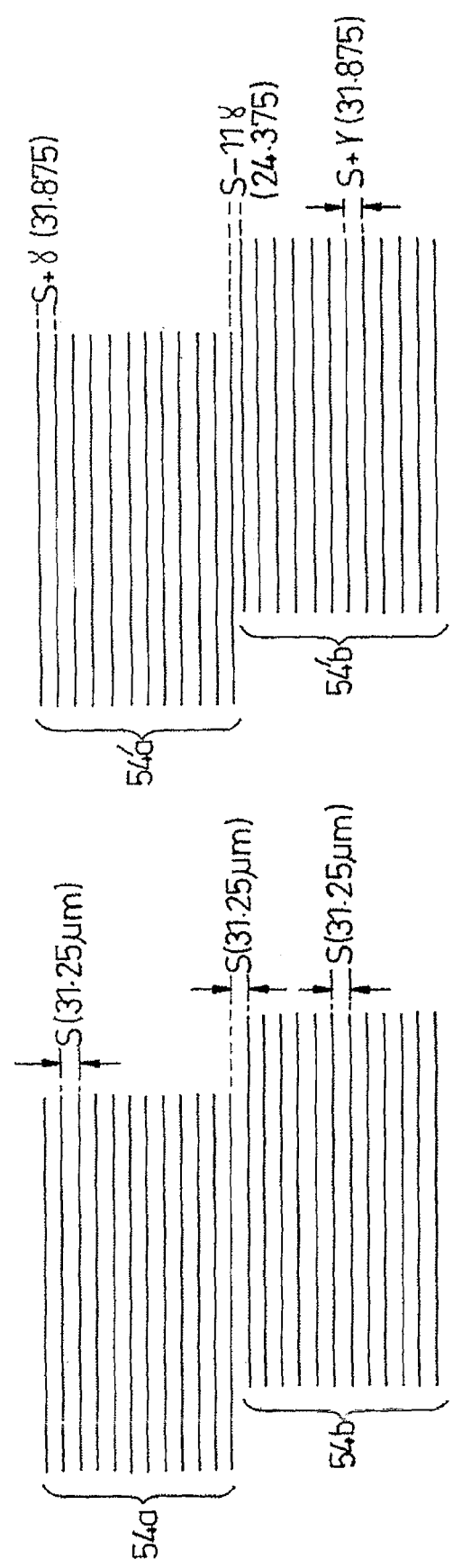
FIG. 12 schematically illustrates an error in the spacing of scan lines between neighbouring swaths of scan lines which may be corrected according to an embodiment of the invention.

During the construction of an electrophotographic printer such as, for example, a laser printer, it is often difficult to adjust the scan line separation S in a multi-beam printer accurately enough so that no visible artifacts result from the residual scan line placement errors. Referring to FIG. 12, two adjacent swaths, as may be produced by a 12-beam printer, are illustrated. The two swaths, labeled 54$a$ and 54$b$, are shown offset from each other in the format direction, this is for illustration purposes only so that the two swaths 54$a$, 54$b$ may be distinguished from each other and such an offset is not actually present. The intended scan line spacing S within a swath 54 may be, for example, 31.25 μm and the intended spacing between the twelfth scan line of the first swath 54$a$ and the first scan line of the second swath 54$b$ will also be 31.25 μm so that all the scan lines used to generate a printed image will have the same spacing.

The effect of an error, γ, of for example, 2% in scan line spacing or 0.625 μm with an intended scan line spacing S of 31.25 μm is illustrated in the swaths labeled 54'$a$ and 54'$b$ in FIG. 12. Such an error would produce scan lines within a print swath that are now 31.875 μm apart (S+γ) and the separation between the first and the twelfth scan lines in the swath is 350.625 μm rather than the intended 343.75 μm. As a result, the eleventh and twelfth scan lines of the first swath 54$a'$ are 31.875 μm apart, but the separation between the twelfth scan line of a first swath 54$a'$ and the first scan line of a second swath 54$b'$ is only 24.375 μm (S−11γ). This 7.5 μm reduction in the separation of adjacent scan lines at the boundary between swaths equates to a periodic 23.5% error in scan line spacing S. Such an error would result in a clearly visible print artifact. Scan line placement errors of the type described in this example, as well as repetitive scan line placement errors due to other causes, can be corrected by embodiments of the invention.

In much the same way as previously described for correcting scan bow, each scan line 52 may be produced by multiple light sources 24 which are incrementally displaced in the cross-scan (or process) direction Y. In one embodiment, the distribution of exposure is adjusted among the light sources 24 as necessary to displace the center of the corrected scan line in the cross-scan direction. Although more light sources 24 can be used, the system and method are described for an example having two light sources 24. The two light sources 24 are positioned so that their resulting focused spots 50 on the photoconductor 10 fall on either side of an intended scan line position 55 for the greatest expected position error. In the absence of a scan line placement error γ, each light source 24 provides 50% of the light needed to expose the scan line 52 and the center of the printed scan line is midway between the images of the light sources (i.e., midway between the centers of the corresponding light spots 50) on the photoconductor 10 and in its desired location. In the presence of a scan line placement error γ, the exposure produced by each light source is adjusted according to the distance between the desired scan line position and the position of the image of the light source on the photoconductor. Thus, the light source 24 whose image on the photoconductor 10 is closest to the intended scan line position 55 supplies a greater portion of the light required for exposing the scan line 52 while the light source 24 whose image on the photoconductor is farther from the intended scan line position 55 provides a smaller portion of the light required for exposure. By this method, the position of the center of the corrected scan line is continuously adjustable between the images of the two light sources on the photoconductor 10. As in the case of scan bow correction, the exposure provided by each light source 50 can be controlled by, for example, power modulation, pulse-width modulation, or a combination of the two.

In a further embodiment, the image of each light source 24 on the photoconductor 10 can be regarded as an alternative possible scan line location and the scan line 52 is written entirely by the light source whose position most closely matches the intended position of the scan line 52. In a calibration procedure, a light source 24 is selected from the multiple light sources 24 corresponding to a scan line 52, the selected light source 50 being chosen to minimize scan line placement error γ. In this embodiment a small residual error will generally exist, but this residual error will be smaller than half the cross-scan separation between the multiple light spots 50 produced by multiple light sources 24 dedicated to a particular scan line 52. This can again be viewed, as a discreet or "stepped" correction approach, as compared to a continuously variable "composite spot" correction approach described above.

An embodiment of the invention enables the addressability of a printer in the process direction to be dynamically and selectively adjusted from job-to-job or within a single print job. The addressability of a printer is usually measured in pixels per inch or its commonly used equivalent "dots per inch" or DPI on the printed image. The process-direction addressability of a printer measured in DPI is equivalent to the number of scan lines per inch because each scan line exposes one row of pixels and the distance between adjacent scan lines is equal to the Y-direction distance between adjacent printer pixels. For a two dimensional image produced on a medium using a 2D array of light sources the addressability in the process direction Y is determined by the scan line spacing S whereas the addressability in the scan direction X is determined by the intensity modulation of the light source which controls the spacing of the exposed pixels in format direction X. A printer so enabled could, for example, selectively print at addressabilities of 600, 800, 1200 and 2400 scan lines per inch and could rapidly switch from one addressability setting to another.

Scan-line addressability, defined as the number of scan lines per inch produced by a printer, has been a fixed characteristic of prior art laser printers. Higher addressability enables the reproduction of smoother edges and finer details, as well as an increased number of density levels for a given number of bits-per-pixel of exposure data modulation. The benefits of increased addressability are generally accompanied by the need for increased file size and file processing times. When image files are stored in a RIP (Raster Image Processor) format having a specific addressability, they are difficult to convert to other addressabilities. Thus, there are competing considerations that determine the optimal addressability for a particular print job. Embodiments of the invention include systems and methods for adjusting the scan-line addressability (DPI) of a laser printer from job-to-job or within a single job (different parts of a page may be printed with different addressabilities), depending on job characteristics and user instructions.

Scan line addressability control is accomplished using an array of light sources 40. The array comprising groups of one or more light sources 50 such that each group of light sources may be used to produce a respective scan line 52. The light spots produced by each group of light sources have a nominal center-to-center spacing S in the process direction Y corresponding to the highest scan-line addressability of the printer.

Figure 13:
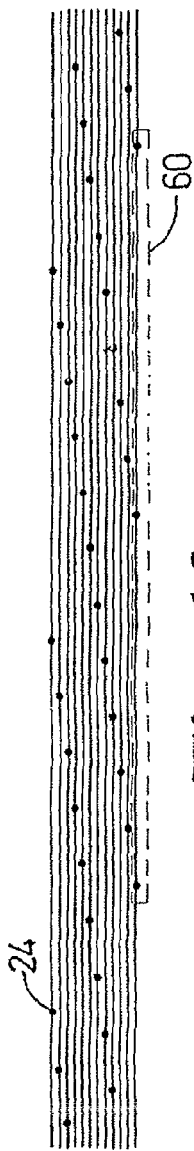
FIG. 13 schematically illustrates, according to an embodiment of the invention, a grid of thirty-six light sources exposing 2400 scan lines per inch with all light sources being active.

For descriptive purposes, an example will be used wherein each group of light sources consists of three light sources 24, referred to herein as a "triad" 60 (illustrated in, for example, FIG. 13). Three light beams are emitted by each triad 60, forming light spots 50 on a photoconductor 10 along a scan line 52 for purposes of exposure enhancement, scan bow correction, scan line placement correction, and the like, as has already been described. If, for example, the highest addressability of a printer is 2400 scan lines per inch, then the light source triads 60 in the array are arranged such that the light spots 50 imaged onto the photoconductor 10 have a process-direction spacing S of 1/2400 inch, or about 10.6 μm.

A first technique for controlling addressability, according to an embodiment of the invention is illustrated in FIGS. 13 to 16. All the light source triads 60 are active when printing at 2400 DPI, the highest addressability produced in this example, as illustrated in FIG. 12. In FIGS. 13 to 16 an active triad 60 is indicated by a horizontal line, representing an exposed scan line 52 on the photoconductor 10, passing through the corresponding focused spot locations. An inactive light source triad 60 is indicated by the absence of such a line. In FIG. 13, all twelve triads 60 are active and 12 scan lines 52 are exposed at 2400 DPI in each print swath 54.

Figure 14:
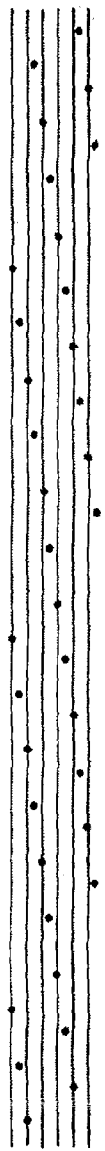
FIG. 14 schematically illustrates, according to an embodiment of the invention, a grid of thirty-six light sources exposing 1200 scan lines per inch with eighteen light sources being active.
Figure 15:
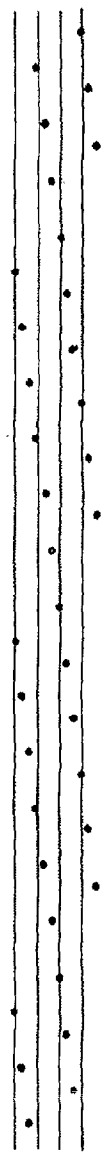
FIG. 15 schematically illustrates, according to an embodiment of the invention, a grid of thirty-six light sources exposing 800 scan lines per inch with twelve light sources being active.
Figure 16:
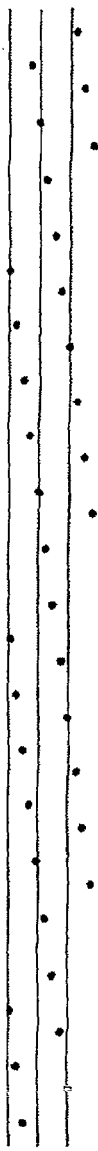
FIG. 16 schematically illustrates, according to an embodiment of the invention, a grid of thirty-six light sources exposing 600 scan lines per inch with nine light sources being active.

When printing at 1200 DPI, as illustrated in FIG. 14, every second light source triad 60 is active and adjacent scan lines are 21.2 μm apart. FIG. 14, shows six scan lines 52 exposed at 1200 DPI by six active light source triads 60. When printing at an addressability of 800 scan lines per inch, as illustrated in FIG. 15, every third light source triad 60 is active and four scan lines are produced 31.8 μm apart in each swath 54. Finally, when printing 600 scan lines per inch, as shown in FIG. 16, every fourth light source triad 60 in the array is active and three scan lines 52 are produced 42.4 μm apart in each swath 54.

Figure 17:
FIG. 17 schematically illustrates, according to an embodiment of the invention, a grid of thirty-six light sources exposing 2400 scan lines per inch with all light sources being active.
Figure 18:
FIG. 18 schematically illustrates, according to an embodiment of the invention, a grid of thirty-six light sources exposing 1200 scan lines per inch with all light sources being active.
Figure 19:
FIG. 19 schematically illustrates, according to an embodiment of the invention, a grid of thirty-six light sources exposing 800 scan lines per inch with all light sources being active.
Figure 20:
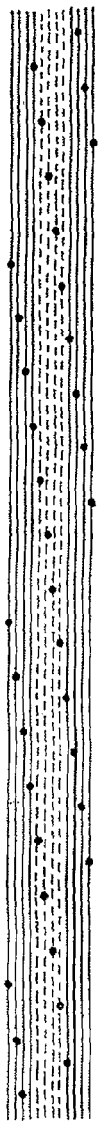
FIG. 20 schematically illustrates, according to an embodiment of the invention, a grid of thirty-six light sources exposing 600 scan lines per inch with all light sources being active.

A second technique for controlling addressability, according to an embodiment of the invention is illustrated in FIGS. 17 to 20. In this technique all light sources 26 are active at all addressabilities. Using the same example array as used to illustrate the first technique, an addressability of 2400 DPI is produced when each light source triad 60 is active and driven with an independent data signal to expose twelve independent scan lines 52 as shown in FIG. 17. As shown in FIG. 18, driving adjacent pairs of light source triads 60 with a common data signal produces an addressability of 1200 DPI. Exposing pairs of adjacent scan lines 10.6 μm apart with a common data signal in this manner produces the same addressability as exposing single scan lines 21.2 μm apart with independent data signals and produces an addressability of 1200 DPI. In FIGS. 18 to 20 groups of adjacent light sources which are driven by common data signals are indicated by the use of a common line type to represent the scan line locations. Thus, a pair of adjacent scan lines represented by solid lines in the FIGS. 18 to 20 share a common data signal while a neighboring pair of scan lines represented by dotted lines share a different data signal. Note that one group of adjacent scan lines represented a common line type, does not share a common data signal with different group of scan lines having the same line type. In FIG. 17, for example, six independent data signals are used to drive twelve light source triads 60, even though only two line types (solid and dotted) are used in the drawing.

Referring to FIG. 19, an addressability of 800 scan lines per inch is produced by driving each group of three adjacent light source triads 60 with a common data signal to achieve an effective scan line separation of 31.8 μm. Similarly, as shown in FIG. 20, 600 DPI printing is achieved by driving each group of four adjacent light source triads 60 with a common data signal to generate composite scan lines 42.4 μm apart. By using all light sources in the laser array when printing at all addressabilities. This technique has the advantages of delivering the maximum achievable exposure to the photoconductor 10 at all addressabilities and of maintaining a substantially constant light exposure per unit area on the photoconductor 10 regardless of the selected addressability.

It should be noted that there may be more or less than three light sources 50 in each group. For example, addressability may be controlled using a one-dimensional array of light sources, or a two-dimensional array having one light source per scan line, in which each scan line is produced using a single light sources 50.

Another embodiment of the invention has a formation of a compact grid of light sources 24. There is a minimum allowable source-to-source spacing that is determined by design rules of the fabrication of an array of light sources. For example, the design rules for the fabrication of lasers such as VCSELs on a wafer establishes a minimum allowable light source-to-light source spacing for the laser array. The spacing between the light spots 50 on the photoconductor 10 is often further increased by the magnification of the optical system that images the light from the light sources 24 onto the photoconductor 10. As a result, the spacing between adjacent spots 50 on the photoconductor 10 is typically large compared to the desired scan line spacing S. Consequently, it is necessary to rotate the light source array 40 through a large angle about the system optical axis to reduce the cross-scan distance between adjacent light sources 24 sufficiently to produce the desired scan line spacing S. In a scanning system having multiple light sources 50, the length of the spot array 40 in the scan direction X can become large.

Figure 21:
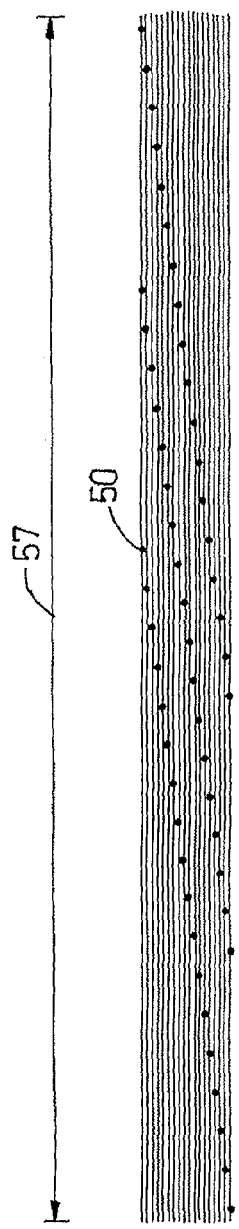
FIG. 21 schematically illustrates, according to an embodiment of the invention, a grid of fifty-four light sources in three rows with three light sources per scan line.

FIG. 21 shows a grid geometry of spots 50 produced by an array 40 having fifty-four light sources 24 arranged in three parallel rows for exposing eighteen scan lines 52 with three light sources per scan line 52. In this example the in-scan length 57 of the spot array is large compared to the cross-scan width of the swath being scanned.

Figure 22:
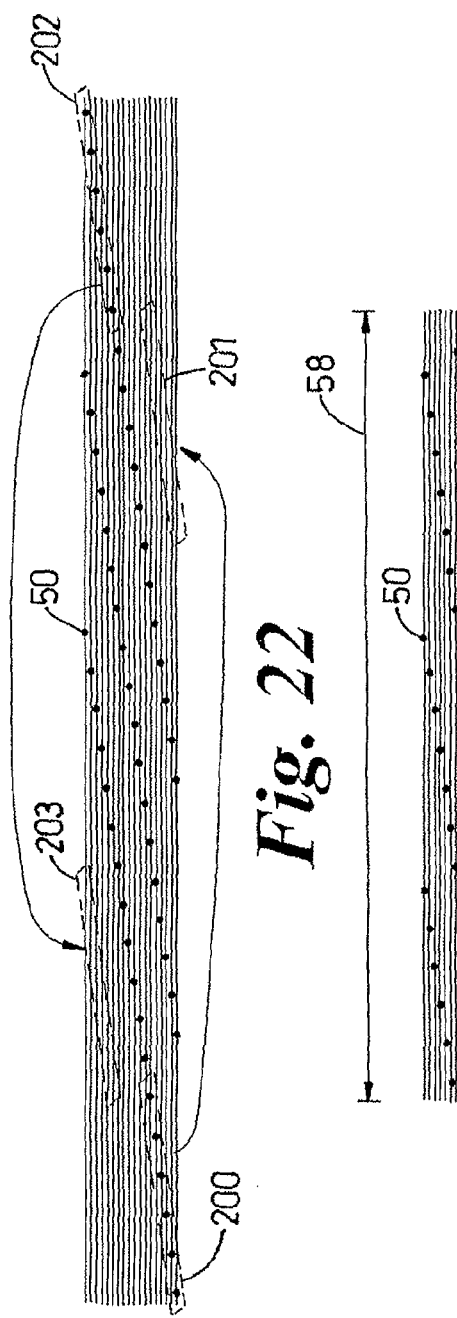
FIG. 22 schematically illustrates, according to an embodiment of the invention, the re-arrangement of the grid illustrated in FIG. 20.
Figure 23:
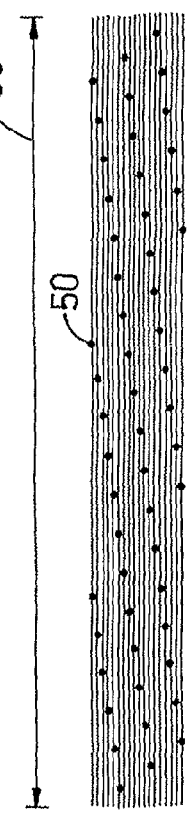
FIG. 23 schematically illustrates, according to an embodiment of the invention, a grid of fifty-four light sources in five rows with three light sources per scan line.

FIG. 22 illustrates a method for reconfiguring the array/grid illustrated in FIG. 21 to produce the more compact grid shown in FIG. 23. Light sources corresponding to focused spots within dotted outline labelled 200 in FIG. 22 are relocated on the light source array 40, thereby relocating these light spots 50 to the indicated locations within dotted outline labelled as 201. Similarly, light sources 24 corresponding to light spots 50 within dotted outline labelled 202 are also relocated, thereby relocating these light spots 50 to the indicated locations within dotted outline 203. By arranging the light sources 24 in five parallel rows instead of the three parallel rows, in this example, the overall length of the light source array 40 in the scan direction X is reduced to the smaller dimension 58. More generally, by this method of relocating a light source 24 that is far from the center of the light source array 40 to a vacant location on the opposite side of the array that is closer to the center of the array, the overall length of both the light source array 40 and the focused spot array are reduced without increasing the width of the array in the cross-scan/process direction Y.

The resulting preferred compact grid of FIG. 23 enables the area of the light source array, as determined by a circumscribed rectangle, to be significantly reduced thereby increasing the number of laser arrays that can be manufactured from a single wafer and reducing the cost of manufacturing each laser array. The compact light source grid also reduces the in-scan direction width of the object field and image field over which the scanning system is required to produce well-corrected imagery. It is evident in FIG. 23 that the width of the image field in the example compact system that provides three beams per scan line is only slightly greater than the width of the image field in a similar system that provides one beam per scan line using a conventional one-dimensional light source array.

Although this embodiment of the invention has been described using an example scanning system having a light source array 40 with multiple light sources per scan line 52, the embodiment applies equally to scanning systems having a laser array with a single light source per scan line. Applying the invention to such a system may transform a one-dimensional light source array into a two-dimensional light source array.

Figure 24:
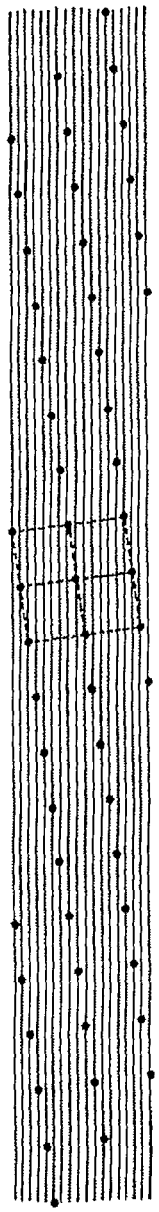
FIG. 24 schematically illustrates, according to an embodiment of the invention, a grid of fifty-four light sources exposing eighteen scan lines with three light sources per scan line, the light sources being arranged with a square unit cell.

FIG. 24 shows an array of focused spots produced by a 54-element light source (emitter) array having a square grid with a unit cell having 30 µm sides. This focused spot geometry prints eighteen scan lines 52 per swath 54 while exposing each printed pixel with three light sources 24. Note that the ends of the outermost emitter rows have been "folded back", creating a more compact emitter array and reducing the required in-scan width of the field of the scan lens.

Figure 25:
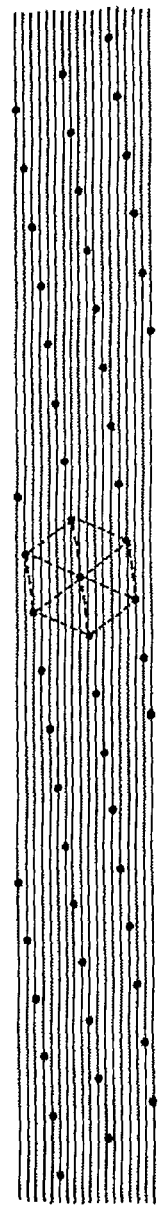
FIG. 25 schematically illustrates, according to an embodiment of the invention, a grid of fifty-four light sources exposing eighteen scan lines with three light sources per scan line, the light sources being arranged with a triangular unit cell.

FIG. 25 illustrates a compact array of focused spots in which the unit cell of the emitter grid is an equilateral triangle having 30 µm sides. As in FIG. 24, the ends of the outer emitter rows have been folded back to reduce the dimensions of the overall array and the required field of the scan lens.

It should be appreciated that all the embodiments of the invention described hereinabove can be realized together on a single printer/printing machine. Embodiments of the invention have applicability to copiers, fax machines, digital printing presses, plate setters for offset printing, direct-to-film laser scanners, scanned laser displays and other printing and display devices.

Although embodiments of the invention have utility for printing the inventors have used their foresight to realize that other embodiments of the invention have utility in other fields of technology in which light is scanned across a medium. Such a field of technology is the fabrication of electrical circuits. Some systems used for the fabrication of electrical circuits or semiconductor devices scan light onto a photoresist coated substrate to produce an exposed scan line on the substrate and then process the substrate by means of a chemical reaction, etching or deposition process (e.g., photolithographical processes). A minimum exposure energy density may be required for the light on the substrate in order that a circuit can be properly manufactured. By using an array of light sources 40 to produce a scan line on the substrate the speed at which the scan line can be produced can be increased without the need to increase the power output of individual light sources.

By having multiple light sources available for each scan line to be produced on the substrate the geometry of the scan lines, and therefore of the resultant circuit, can be controlled. The control may be exercised in the same, or a similar, way to that which has hereinabove been described in relation to printers. That is, the scan line geometry may be controlled by controlling the optical power produced by the plurality of light sources that can be used to produce a scan line on the substrate. Artifacts such as scan bow that have been discussed in relation to printers may also occur when producing scan lines on a substrate for an electrical circuit and such artifacts can be corrected in the same or a similar way.

Making printed circuits or some kinds of semiconductor structures (e.g., photolithographically) can be considered a form of printing.

Another field of technology wherein embodiments of the invention have utility is the field of displays in which light is scanned across a medium, typically a reflective, transmissive or phosphorescent display screen, to display information and images using raster scanned beams of light. In much the same way as previously described for laser printers, such displays often scan light spots across a display screen to form scan lines that produce a displayed image. In an embodiment of the invention light from a 2D array of light sources is arranged to scan a reflective or transmissive viewing screen in the X and Y directions, thereby forming a raster image for displaying information.

What is claimed is:

1. An apparatus comprising:
   a two-dimensional array of light sources, each light source in the two-dimensional array producing at least three exposure levels;
   a scanning device arranged to scan light emitted from the light sources onto a medium to generate a plurality of scan lines on the medium;
   each scan line produced by scanning a plurality of light spots generated by the plurality of light sources onto the medium;
   the light sources and scanning device being arranged such that a composite exposure level for each pixel in a first scan line is a sum of exposure levels from each of a plurality of the light sources, each of the plurality of the light sources being driven by a separate data signal to allow selection of different composite exposure levels for different pixels in the first scan line.

2. The apparatus of claim 1, wherein the apparatus is a printer and the medium upon which the scan lines are generated comprises a photosensitive surface.

3. The apparatus of any one of claim 1, wherein the two-dimensional array of light sources comprises a two-dimensional array of vertical cavity surface emitting lasers.

4. The apparatus of claim 1, further comprising a controller to control optical power of light produced by the light sources, the controller arranged to supply control signals to each of at least two of the plurality of light sources, the control signals controlling the at least two of the plurality of light sources so as to vary exposure levels for different pixels in a same scan line.

5. The apparatus of claim 1, comprising:
   a controller to control optical power of light produced by the light sources, wherein the controller is arranged to supply control signals to each of at least two of the plurality of light sources, the control signals being complementary data signals which vary exposure levels for different pixels in a same scan line.

6. A method of printing, in a printer comprising a two-dimensional array of light sources and a scanning device arranged to scan light emitted from the light sources onto a photosensitive surface, the light sources and scanning device being arranged such that a plurality of light sources can be used to generate a scan line, the method comprising:
   scanning light from the two-dimensional array of light sources across the photosensitive surface to generate a plurality of scan lines on the photosensitive surface, including
   scanning light spots generated by the light sources onto the medium to produce the scan lines, and
   driving each of a plurality of the light sources by a separate data signal to allow selection of different composite exposure levels for different pixels in a first scan line where a composite exposure level for each pixel in the first scan line is a sum of exposure levels from each of the plurality of the light sources, wherein each light source in the plurality of light sources produces at least three exposure levels.

7. The method of claim 6 comprising exposing each of the plurality of scan lines with at least two of the plurality of light sources and receiving, by each of said at least two of the plurality of light sources, a control signal, the control signals controlling the at least two of the plurality of light sources dependent from a desired composite exposure level for a pixel in the scan line.

8. The method of claim 7, wherein the control signal causes each of the plurality of light sources to be one of (i) off, (ii) at maximum optical power output, and (iii) one of at least one optical power level that is intermediate between off and maximum optical power output.

9. The method of claim 6, wherein the two-dimensional array of light sources is arranged such that each of the plurality of light sources is used to produce a light spot on the photosensitive surface such that the light spots have different positions relative to each other in a direction transverse to the direction of the scan line.

10. A printer comprising:
    a 2D array of vertical cavity surface emitting lasers, each vertical cavity surface emitting lasers in the 2D array producing at least three exposure levels;
    an optical means to receive light from the vertical cavity surface emitting lasers and form an array of light spots on a photosensitive surface;
    a polygon mirror arranged to scan the array of light spots across the photosensitive surface to generate a plurality of scan lines on the photosensitive surface; and
    a controller to control the optical power of light produced by the vertical cavity surface emitting lasers;
    wherein the vertical cavity surface emitting lasers and the polygon mirror are arranged such that a plurality of vertical cavity surface emitting lasers is used to generate each scan line of the plurality of scan lines and the controller is arranged to supply control signals to each of at least two of said plurality of vertical cavity surface emitting lasers, the control signals being different from each other so as to vary exposure levels of pixels within a scan line, at least some of the pixels in the scan line being irradiated by all of the at least two of the plurality of vertical cavity surface emitting lasers.

* * * * *

UNITED STATES PATENT AND TRADEMARK OFFICE
CERTIFICATE OF CORRECTION

| | | |
|---|---|---|
| PATENT NO. | : 8,928,720 B2 | Page 1 of 1 |
| APPLICATION NO. | : 12/090322 | |
| DATED | : January 6, 2015 | |
| INVENTOR(S) | : David K. Towner et al. | |

It is certified that error appears in the above-identified patent and that said Letters Patent is hereby corrected as shown below:

In the claims

In column 19, line 30, in Claim 3, delete "of any one of" and insert -- of --, therefor.

Signed and Sealed this
Seventeenth Day of May, 2016

Michelle K. Lee
*Director of the United States Patent and Trademark Office*